(12) United States Patent
Sunkara

(10) Patent No.: US 7,179,769 B2
(45) Date of Patent: Feb. 20, 2007

(54) POLY (TRIMETHYLENE-ETHYLENE ETHER) GLYCOL LUBE OILS

(75) Inventor: Hari Babu Sunkara, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 314 days.

(21) Appl. No.: 10/743,223

(22) Filed: Dec. 22, 2003

(65) Prior Publication Data

US 2005/0014661 A1 Jan. 20, 2005

Related U.S. Application Data

(63) Continuation-in-part of application No. 10/621,896, filed on Jul. 17, 2003, now Pat. No. 6,979,492, and a continuation-in-part of application No. 10/621,892, filed on Jul. 17, 2003, now abandoned, and a continuation-in-part of application No. 10/621,861, filed on Jul. 17, 2003, now Pat. No. 6,946,539, and a continuation-in-part of application No. 10/621,805, filed on Jul. 17, 2003, now Pat. No. 6,905,765.

(51) Int. Cl.
*C10M 107/34* (2006.01)

(52) U.S. Cl. .................................................. 508/579

(58) Field of Classification Search ............. 508/579
See application file for complete search history.

(56) References Cited

U.S. PATENT DOCUMENTS

| | | | |
|---|---|---|---|
| 2,491,432 A | 12/1949 | White | |
| 2,520,733 A | 8/1950 | Morris et al. | |
| 2,599,803 A | 6/1952 | Ballard | |
| 2,717,242 A | 9/1955 | Foehr | |
| 4,588,802 A | 5/1986 | Chang | |
| 4,755,316 A | 7/1988 | Magid et al. | |
| 5,342,531 A | 8/1994 | Walters et al. | |
| 5,403,912 A | 4/1995 | Gunatillake et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 5,882,800 A | 3/1999 | Brennan et al. | |
| 6,069,222 A | 5/2000 | Kaneda et al. | |
| 6,183,661 B1 * | 2/2001 | Makin et al. ................. 252/68 |
| 6,562,457 B1 | 5/2003 | Goldfinger et al. | |
| 6,590,065 B1 | 7/2003 | Goldfinger | |
| 6,599,625 B2 | 7/2003 | Goldfinger et al. | |
| 6,720,459 B2 | 4/2004 | Sunkara et al. | |
| 2002/0007043 A1 | 1/2002 | Sunkara et al. | |
| 2004/0030060 A1 | 2/2004 | Sunkara et al. | |
| 2004/0030089 A1 | 2/2004 | Sunkara | |
| 2004/0030095 A1 | 2/2004 | Sunkara et al. | |
| 2004/0077823 A1 | 4/2004 | Sunkarar | |
| 2004/0127673 A1 | 7/2004 | Sunkara | |
| 2004/0185263 A1 | 9/2004 | Sormani et al. | |

FOREIGN PATENT DOCUMENTS

| | | |
|---|---|---|
| EP | 330522 B1 | 8/1989 |
| GB | 1560830 | 2/1980 |

OTHER PUBLICATIONS

International Search Report —Application No. PCT/US03/24390—Dated Dec. 29, 2003.
Copending U.S. Appl. No. 60/456,756, filed Mar. 21, 2003.
Copending U.S. Appl. No. 10/393,754, filed Mar. 21, 2003.
Copending U.S. Appl. No. 10/621,861, filed Jul. 17, 2003.
Copending U.S. Appl. No. 10/621,805, filed Jul. 17, 2003.

* cited by examiner

*Primary Examiner*—Edward J. Cain
(74) *Attorney, Agent, or Firm*—Mark D. Kuller; Bart E. Lerman

(57) ABSTRACT

A lube oil composition is disclosed which comprises poly (trimethylene-ethylene ether) glycol and at least one lube oil additive. The base stock can be optionally mixed with other base stocks. Preferably, the composition is used as hydraulic fluid, brake fluid, heat transfer fluid, compressor lubricant, textile and calender lubricant, metalworking fluid, refrigeration lubricant, two-cycle engine lubricant or crankcase lubricant.

32 Claims, No Drawings

POLY (TRIMETHYLENE-ETHYLENE ETHER) GLYCOL LUBE OILS

CROSS-REFERENCE TO RELATED APPLICATIONS

This application is a continuation-in-part of U.S. Ser. No. 10/621,892, filed Jul. 17, 2003, now abandoned (SO-0008 US NA) for POLY(TRIMETHYLENE-ETHYLENE ETHER) GLYCOLS; Ser. No. 10/621,861, filed Jul. 17, 2003, now U.S. Pat. No. 6,946,539, (SO-0032 US NA) for POLYURETHANE AND POLYURETHANE-UREA COMPRISED OF POLY(TRIMETHYLENE-ETHYLENE ETHER) GLYCOL SOFT SEGMENT; Ser. No. 10/621,896, filed Jul. 17, 2003, now U.S. Pat. No. 6,979,492, (SO-0031 US NA) for THERMOPLASTIC ELASTOMER COMPRISING POLY(TRIMETHYLENE-ETHYLENE ETHER) SOFT SEGMENT AND POLYAMIDE HARD SEGMENT; and Ser. No. 10/621,805, filed Jul. 17, 2003, now U.S. Pat. No. 6,905,765, (SO-0030 US NA) for POLYETHER ESTER ELASTOMERS COMPRISING POLY(TRIMETHYLENE-ETHYLENE ETHER) ESTER SOFT SEGMENT AND ALKYLENE ESTER HARD SEGMENT, all of which are incorporated herein by reference in their entireties.

FIELD OF THE INVENTION

This invention relates to lube oil compositions, in particular, lube oil compositions comprising poly(trimethylene-ethylene ether) glycol base stock.

BACKGROUND OF THE INVENTION

Lubricating oils typically used in the industry comprise a mineral oil or synthetic oil as a base oil, and various additives for a particular purpose. Among various synthetic lubricants, polyalkylene glycols are unique because of their high oxygen content. These glycols have found use as petroleum lubricant replacements due to their unique attributes such as lower pour point, higher viscosity index, lower tendency to form tar and sludge, increased solvency, wider range of solubilities, higher flash points, lower vapor pressure, lower ash and metals content. The polyalkylene glycols that are used commercially as lubricants are homopolymers of propylene oxide which are water-insoluble, copolymers of ethylene oxide and propylene oxide which are water-soluble, polymers of butylene oxide, polymers of propylene oxide and higher epoxides, and polymers of propylene oxide that are dimethyl ethers. Polyalkylene glycol base stocks are available commercially, for example, from Dow under trade name "UCON Fluids".

The polyalkylene glycols are generally prepared by ring opening polymerization of epoxides such as ethylene oxide, propylene oxide or butylene oxide with a starter that consists of an alcohol or diol and a smaller amount of its metal alkoxide, usually the potassium or sodium salt. The petrochemically derived ingredients used to manufacture polyalkylene glycols are, in general, toxic, highly flammable, volatile and thus are not safe, are difficult to handle and are not environmentally friendly. In addition, the polymerization reactions are highly exothermic and concentration of unreacted epoxides in the reactor can cause reactor failures.

Polytrimethylene ether glycol ("PO3G") and its use have been described in a number of patents and patent applications. PO3G can be prepared by dehydration of 1,3-propanediol (PDO) or by ring opening polymerization of oxetane. PO3G can be prepared from 1,3-propanediol, preferably as described in U.S. Published Patent Application Nos. 2002/7043 A1 and 2002/10374 A1, both of which are incorporated herein by reference.

U.S. Published Patent Application No. 2002/7043 A1 teaches that the reaction mixture can comprise up to 50 mole %, preferably 1 to 20 mole %, based on all diols present, of a comonomer diol other than oligomers of 1,3-propanediol. Listed are 2-methyl-1,3-propanediol, 2,2-dimethyl-1,3-propanediol, 2,2-diethyl-1,3-propanediol, 1,6-hexanediol, 1,8-octanediol, 1,10-decanediol, 1,12-dodecanediol and mixtures thereof. More preferred as comonomers are 2-methyl-1,3-propanediol, 2,2-dimethyl-1,3-propanediol, and 2,2-diethyl-1,3-propanediol.

Similarly, U.S. Published Patent Application No. 2002/10374 A1 teaches that the reaction mixture can comprise up to 50 mole %, preferably 1 to 20 mole %, based on all diols present, of a comonomer diol other than oligomers of 1,3-propanediol. Listed are aliphatic diols, for example 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, 3,3,4,4,5,5,6,6,7,7,8,8,9,9,10,10-hexadecafluoro-1,12-dodecanediol, cycloaliphatic diols, for example 1,4-cyclohexanediol, 1,4-cyclohexanedimethanol and isosorbide, polyhydroxy compounds, for example glycerol, trimethylolpropane, and pentaerythritol. A preferred group of comonomer diol is selected from the group consisting of 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof.

Synthetic lube oil compositions typically comprise a mixture of at least one synthetic base oil (base stock) and one or more additives. Depending on the application needs, a suitable base stock having desired properties can be selected and additives are employed for the purpose of improving the performance and properties of the base stock in its intended application.

By way of illustrative example, lubricating oils have been used to lubricate the bearings of positive displacement compressors, to seal the rotors, and to cool the compressed gases. Oxidation stability and varnish and deposit control are some of the important properties desirable in a lubricant for maximizing the life of the lubricant, and hence, the life of the equipment, especially under the high temperature and pressure conditions created when operating a positive displacement compressor, such as a reciprocating rotary vane, scroll, or rotary screw air compressor. It has also been desirable in the industry to provide a lubricating composition which does not deteriorate due to high temperatures. Thermal stability, demulsibility and hydrolytic stability, particularly under high temperature and pressure conditions of a lubricating oil are also desirable.

Polyalkylene glycols that are produced from ethylene oxide and propylene oxide have inherently low stability towards oxidation and thus require large amounts of an antioxidant that can cause undue lacquer formation on engine parts, due apparently to the stabilizer itself, and also increases the cost. U.S. Pat. No. 2,520,733, which is incorporated herein by reference in its entirety, discloses the use of poly(trimethylene glycol) as a lubricant which has better stability with or without antioxidants over propylene oxide polymers.

Gears are used in industry, transportation, and many other areas. Gears transmit power and alter the direction of movement. The load on gear teeth (the load-bearing surface)

is intermittent and higher than on most other bearing or loaded surfaces. The lateral sliding action of gear teeth imposes severe lubrication requirements. While gear lubricants must have superior anti-wear and extreme pressure protection they must also be non-corrosive to "yellow metal" (copper alloy) components. Gear lubricants, particularly ones used in mining, milling, and similar operations need to be composed of high viscosity index oils and extreme pressure/anti-wear agents.

For water-soluble polyalkylene glycol as the base oil for lubricants encountering metal-to-metal contact under conditions of load or pressure, such as gear lubricants, it is necessary to increase wear resistance and improve extreme pressure properties. U.S. Pat. No. 5,342,531 which is incorporated herein by reference, describes the drawbacks of water-soluble polyalkylene glycols which include relatively poor solvency characteristics for most conventional antiwear and extreme pressure additives. Moreover, because polyalkylene glycols tend to be hygroscopic, excessive corrosion of metal surfaces can result under actual service conditions because of the presence of water picked up by the poyalkylene glycol base oil.

In compressor refrigerant systems, for example in automobile air conditioning systems, R134a (1,1,1,2-tetrafluoroethane) has been mentioned as a possible replacement for R12 (dichlorodifluoromethane) because of concern over potential depletion of the ozone layer. Unlike R-12, R134a is not miscible with mineral oils and consequently, different lubricants are required. If the lubricant separates from the refrigerant it would be expected that serious operating problems could result. For example, the compressor could be inadequately lubricated if refrigerant replaces the lubricant. Significant problems in other equipment could also result if a lubricant phase separates from the refrigerant during condensation, expansion or evaporation. Illustrative, non-limiting example of additives used with the lube oil base stock in compressor system applications are extreme pressure and antiwear additive, oxidation and thermal stability improver, corrosion inhibitor, viscosity index improver, pour point depressant, floc-point depressant, detergent, anti-foaming agent, viscosity adjuster and mixtures thereof.

According to U.S. Pat. No. 4,755,316, certain polyalkylene glycols having at least dual hydroxy functionality (that is, they are truly glycols, not esters or ethers) are particularly useful as lubricants with R134a. Polyoxypropylene glycols were found to be miscible with R134a over a satisfactory range. However, the hygroscopic nature of polyalkylene glycol could be an issue.

Also by way of illustrative example, lubricating oil compositions used to lubricate internal combustion engines contain base oil of lubricating viscosity, or a mixture of such oils, and additives used to improve the performance characteristics of the oil. For example, additives are used to improve detergency, reduce engine wear, provide stability against heat and oxidation, reduce oil consumption, inhibit corrosion, act as a dispersant, and reduce friction loss. Some additives provide multiple benefits, such as a dispersant/viscosity modifier.

To provide improved low temperature valve train wear performance, conventional lubricants are formulated with an antiwear additive. Metal hydrocarbyl dithiophosphates, particularly zinc dialkyldithiophosphates (ZDDP), are examples of an antiwear additive used in lubricating oils for internal combustion engines. ZDDP provides excellent wear protection at a comparatively low cost and also functions as an antioxidant.

Over the past several decades, the use of spark-ignited two-cycle (2-stroke) internal combustion engines has steadily increased. They are presently found in power lawn mowers and other power-operated garden equipment, power chain saws, pumps, electrical generators, marine outboard engines, snowmobiles, motorcycles and the like. The increasing use of two-cycle engines coupled with increasing severity of the conditions in which they have operated has led to an increased demand for oils to adequately lubricate such engines and to provide enhanced performance.

Grease lubrication of bearings, gears, and other components is used when seals or other devices can not be used to prevent migration of the lubricant away from lubricated surfaces. Grease consists of thickeners, typically 6 to 10 percent by weight of the mixture, lubricating oil, and additives to enhance the performance of the grease. The thickener in grease acts as a "sponge" to keep the oil and additives on the bearing, gear, or other component being lubricated. The additives used in grease blending are similar to the ones used in the production of gear, engine oil, and other petroleum-based lubricants.

Upper cylinder lubricants act to lubricate and clean the ring and upper cylinder area of spark and compression ignition engines. This action can benefit fuel economy, emissions, as well as ring and cylinder wear.

With the development of disk brakes, more powerful engines and heavier vehicles, brake fluids with increasing thermal stability are required.

In hydraulic systems for motor vehicles auxiliary aggregates operated with piston pumps or vane pumps are used to an increasing extent (for example, steering and coupling aids, antiblocking devices, level regulators). Consequently, higher demands are made on the lubricating properties of the hydraulic fluid. Hydraulic fluids used in automotive hydraulic brake systems must satisfy a variety of requirements. In general, these include chemical and thermal stability, suitable viscosities for the intended use, fluidity over the use-temperature range, low volatility, non-corrosiveness to metals, limited effect on rubber parts and good tolerance for water. Thus, a hydraulic brake fluid to be commercially acceptable is required to meet industry-accepted specifications as well as those established by governmental agencies.

SUMMARY OF THE INVENTION

According to a first aspect, a lube oil composition comprises poly(trimethylene-ethylene ether) glycol base stock and at least one lube oil additive. Preferably, the additive comprises at least one of ashless dispersant, metal detergent, viscosity modifier, anti-wear agent, antioxidant, friction modifier, pour point depressant, anti-foaming agent, corrosion inhibitor, demulsifier, rust inhibitor and mixtures thereof.

According to another aspect, a lube oil composition comprises:
  (a) polyalkylene glycol base stock produced from the reaction of 1,3-propanediol and 1,2 ethanediol, and
  (b) at least one lube oil additive.

Preferably, the polyalkylene glycol base stock is produced from the polycondensation of 1,3-propanediol and 1,2 ethanediol. Preferably, at least one of the 1,3-propanediol and 1,2 ethanediol is derived from a renewable source. Most preferably, the 1,3-propanediol is derived from a renewable source.

According to a further aspect, the lube oil additive comprises at least one of ashless dispersant, metal detergent, viscosity modifier, anti-wear agent, antioxidant, friction modifier, pour point depressant, anti-foaming agent, corrosion inhibitor, demulsifier, rust inhibitor and mixtures thereof.

According to a further aspect, the poly(trimethylene-ethylene ether) glycol base stock has a number average molecular weight of 500 to 5000.

According to a further aspect, the poly(trimethylene-ethylene ether) glycol base stock has a molecular weight distribution of 1.2 to 2.2.

According to yet another aspect, the poly(trimethylene-ethylene ether) glycol base stock has a kinematic viscosity at 40° C. of about 50 to about 2000 centistokes.

According to a further aspect, the poly(trimethylene-ethylene ether) glycol base stock has a viscosity index of 150 to 350.

According to another aspect, the poly(trimethylene-ethylene ether) glycol base stock has a pour point of −75 to 0° C.

According to another aspect, the lube oil composition is used as hydraulic fluid, brake fluid, heat transfer fluid, compressor lubricant, textile and calender lubricant, metal-working fluid, refrigeration lubricant, two-cycle engine lubricant or crankcase lubricant.

In yet another aspect the lube oil composition is used as refrigerant lubricant and the additive is at least one of extreme pressure and antiwear additive, oxidation and thermal stability improver, corrosion inhibitor, viscosity index improver, pour point depressant, floc point depressant, detergent, anti-foaming agent, viscosity adjuster and mixtures thereof.

DETAILED DESCRIPTION OF THE INVENTION

Unless stated otherwise, all percentages, parts, ratios, etc., are by weight. Trademarks are shown in upper case.

All patents, patent applications, and publications referred to herein are incorporated by reference in their entirety.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In accordance with the present invention, a lube oil composition comprises:
  (a) poly(trimethylene-ethylene ether) glycol base stock and
  (b) at least one lube oil additive.

The poly(trimethylene-ethylene ether) glycol is preferably prepared from 1,3-propanediol reactant and ethylene glycol reactant. It is preferably prepared by polycondensation of 1,3-propanediol reactant and ethylene glycol reactant, more preferably by the polycondensation of 1,3-propanediol and ethylene glycol.

By "1,3-propanediol reactant" is meant 1,3-propanediol, its dimers and trimers, and mixtures thereof. In addition, "polytrimethylene ether glycol" and "poly(trimethylene-ethylene ether) glycol" are used to refer to polymers having a Mn of 250 or more.

By "ethylene glycol reactant" is meant ethylene glycol, and its trimers and tetramers. In addition, "polyethylene glycol" is used to refer to polymers having a Mn of 250 or more. Diethylene glycol will cyclize to dioxane during acid catalyzed polycondensation and, therefore, its presence should preferably be kept to a minimum.

In one preferred embodiment, the 1,3-propanediol reactant is 1,3-propanediol.

In one preferred embodiment, the ethylene glycol reactant is 1,2 ethanediol.

The preferred starting materials are 1,3-propanediol and 1,2 ethanediol, and in some instances for simplicity, applicants will refer to 1,3-propanediol and ethylene glycol in describing the process. It is preferred that at least one of the 1,3-propanediol and 1,2-ethanediol be obtained from a renewable source. Most preferably, the 1,3-propanediol is obtained from a renewable source.

As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in e.g., in the species *Klebsiella*, *Citrobacter*, *Clostridium*, and *Lactobacillus*. The technique is disclosed in several patents, including, U.S. Pat. Nos. 5,633,362, 5,686,276, and 5,821,092. In U.S. Pat. No. 5,821,092, Nagarajan et al. disclose, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3-propanediol monomer useful in the production of polyesters, polyethers, and other polymers.

According to another aspect, a lube oil composition comprises:
  (a) polyalkylene glycol base stock produced from the reaction of 1,3-propanediol and 1,2 ethanediol, and
  (b) at least one lube oil additive.

The poly(trimethylene-ethylene ether) glycols are preferably prepared using at least about 1 mole %, more preferably at least about 10 mole %, most preferably at least about 30 mole % of ethylene glycol reactant based on the total amount of 1,3-propanediol reactant and ethylene glycol reactant. Preferably up to about 70 mole %, more preferably up to about 50 mole %, and most preferably up to about 40 mole %, of ethylene glycol reactant is used, based on the total amount of 1,3-propanediol reactant and ethylene glycol reactant. Accordingly, the poly(trimethylene-ethylene ether) glycols are preferably prepared using up to about 99 mole %, more preferably up to about 90 mole %, most preferably up to about 70 mole %, and preferably at least about 30 mole %, and more preferably at least about 50 mole %, and most preferably at least about 60 mole % of 1,3-propanediol reactant based on the total amount of 1,3-propanediol reactant and ethylene glycol reactant.

The process can be batch, semi-continuous, continuous, etc., and the ethylene glycol can be added prior to or during the reaction. The poly(trimethylene-ethylene ether) glycols can be prepared using the methods described in U.S. Published Patent Application Nos. 2002/7043 A1 and 2002/10374 A1, both of which are incorporated herein by reference in their entireties, with further reaction of the ethylene glycol with the 1,3-propanediol reactant.

Thus, the poly(trimethylene-ethylene ether) glycol can be prepared by a process comprising the steps of: (a) providing (1) 1,3-propanediol reactant, (2) ethylene glycol reactant and (3) acid polycondensation catalyst; and (b) polycondensing the 1,3-propanediol and ethylene glycol reactants to form a poly(trimethylene-ethylene ether) glycol. Preferably, the reaction is conducted at elevated temperatures for example about 150 to about 210° C., and preferably at atmospheric pressure or preferably at less than one atmosphere pressure. In one preferred embodiment thereof, the process comprises the steps of: (a) providing 1,3-propanediol, ethylene glycol and acid polycondensation catalyst; (b) condensing 1,3-propanediol and ethylene glycol reactants to form oligomers or prepolymers thereof having an average degree of polymerization of 2 to 20, preferably 2 to 9, or a mixture comprising one or more thereof; and (c) polycondensing the oligomer or prepolymer or mixture to form a poly(trimethylene-ethylene ether) glycol at atmospheric inert gas pressure, preferably nitrogen or less than one atmosphere pressure. Preferably step b) is carried out at about atmospheric pressure, the pressure in step c) is less than 300 mm Hg (40 kPa), the temperature in step b) is about 150 to about 210° C. and the temperature in step c) is about 150 to about 250° C.

The poly(trimethylene-ethylene ether) glycols of the present invention can be produced continuously using the procedure of U.S. Published Patent Application No. 2002/10374 A1. Thus, the poly(trimethylene-ethylene ether) glycol can be prepared by a continuous process comprising: (a) continuously providing (i) 1,3-propanediol and ethylene glycol reactants, and (ii) polycondensation catalyst; and (b) continuously polycondensing the reactants to form poly(trimethylene-ethylene ether) glycol. Preferably the polycondensing is carried out in two or more reaction stages. Preferably the polycondensing is carried out at a temperature greater than about 150° C., more preferably greater than about 180° C. and preferably less than about 250° C., more preferably less than about 210° C. Preferably the polycondensation is carried out at a pressure of less than one atmosphere, preferably at least about 50 mm Hg. In one preferred continuous process the polycondensation is carried out in an up-flow co-current column reactor and the 1,3-propanediol reactant, ethylene glycol reactant and poly(trimethylene-ethylene ether) glycol flow upward co-currently with the flow of gases and vapors, preferably where the reactor has 3 to 30 stages, more preferably 8 to 15 stages. The 1,3-propanediol reactant can be fed to the reactor at one or multiple locations. In another preferred embodiment, the polycondensation is carried out in a counter current vertical reactor wherein the 1,3-propanediol and ethylene glycol reactants and poly(trimethylene-ethylene ether) glycol flow in a manner counter-current to the flow of gases and vapors. Preferably the reactor has two or more stages. Preferably the 1,3-propanediol reactant and ethylene glycol reactant are fed at the top of the reactor, and preferably the ethylene glycol reactant is also fed at multiple locations to the reactor. In yet another preferred embodiment, the polycondensation is first carried out in at least one prepolymerizer reactor and then continued in a column reactor, the 1,3-propanediol reactant comprises 90 weight % or more 1,3-propanediol and the ethylene glycol reactant comprises 90 weight % or more ethylene glycol, and in the prepolymerizer reactor the 1,3-propanediol is polymerized with the catalyst to a degree of polymerization of at least 5. Most preferably, in the at least one prepolymerizer reactor the 1,3-propanediol and ethylene glycol are polymerized with the catalyst to a degree of polymerization of at least 10 and the column reactor comprises 3 to 30 stages. Preferably the at least one prepolymerizer reactor is a well-mixed tank reactor.

The poly(trimethylene-ethylene ether) glycol can also be prepared by a semi-continuous process comprising the steps of: (a) batch polycondensing 1,3-propanediol reactant in the presence of acid polycondensation catalyst; and (b) adding ethylene glycol reactant to the batch polycondensing over time.

The polycondensation catalysts preferred for these reactions are described in U.S. Published Patent Application Nos. 2002/7043 A1 and 2002/10374 A1. They include homogeneous catalysts such as Lewis Acids, Bronsted Acids, super acids, and mixtures thereof. Examples include inorganic acids, organic sulfonic acids, heteropolyacids, and metal salts thereof. Preferred are sulfuric acid, fluorosulfonic acid, phosphorus acid, p-toluenesulfonic acid, benzenesulfonic acid, phosphotungstic acid, phosphomolybdic acid, trifluoromethanesulfonic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate and zirconium triflate. Heterogeneous catalysts, such as zeolites, fluorinated alumina, acid-treated silica, acid-treated silica-alumina, heteropolyacids and heteropolyacids supported on zirconia, titania, alumina and/or silica, can also be used. Preferred are the aforementioned homogeneous catalysts, and most preferred is sulfuric acid.

The poly(trimethylene-ethylene ether) glycol prepared from the above process is optionally purified as described in U.S. Published Patent Application Nos. 2002/7043 A1 and 2002/10374 A1, or by other means. Sometimes, it is desired to hydrolyze the sulfate ester groups present in the polymer to improve functionality of the polymer for use as an intermediate in the preparation of thermoplastic elastomers. The functionality of the polymer refers to the number of hydroxyl groups per molecule. In general, the functionality of poly(trimethylene-ethylene ether) glycol is close to 2 because very few polymer molecules may contain unsaturation ends. Depending upon the application, the water soluble low molecular weight fraction is either removed from the polymer or retained. The acid present in the polymer is either removed or neutralized with a soluble base. Neutralization with a base is accompanied by the formation of alkali metal salt. If insoluble base is used to neutralize the acid present in the polymer, the salts formed can be removed by filtering the polymer.

Preferably, the poly(trimethylene-ethylene ether) glycol base stock has a number average molecular weight of 500 to 5000, more preferable 700 to 4000, most preferably 1000 to 3000. Also preferably, the poly(trimethylene-ethylene ether) glycol base stock has a molecular weight distribution (weight average molecular weight divided by number average molecular weight, $M_w/M_n$) of 1.2 to 2.2, more preferably 1.4 to 2.0, most preferably 1.4 to 1.8.

Preferably, the poly(trimethylene-ethylene ether) glycol base stock has a kinematic-viscosity at 40° C. of about 50 to about 2000 centistokes (cSt), more preferably 100 to about 1500 cSt, most preferably about 150 to about 1000 cSt.

Preferably, the poly(trimethylene-ethylene ether) glycol base stock has a viscosity index (VI) of 150 to 350, more preferably 175 to 325, most preferably 200 to 300.

Also preferably, the poly(trimethylene-ethylene ether) glycol base stock has a pour point of −75 to 0° C., more preferably 60 to −10° C., most preferably −50 to −20° C.

According to another aspect, the poly(trimethylene-ethylene ether) glycol base stock is water-insoluble. Additionally, the base stock can be mixed with additional base stock. The additional base stock can comprise at least one of hydrocarbonaceous base stock, synthetic base stock and mixtures thereof. Preferably, the additional base stock comprises synthetic base stock.

In another aspect, the base stock is mixed with at least one tetrafluroethane.

Synthetic lube oil compositions typically comprise a mixture of at least one synthetic base stock and one or more additives, where each additive is employed for the purpose of improving the performance and properties of the base stock in its intended application, e.g., as a crankcase lubricant. The identification of the additive(s) for a particular use is well within the skill of the art.

According to another aspect in accordance with the present invention, the lube oil composition is used as hydraulic fluid, brake fluid, heat transfer fluid, compressor lubricant, textile and calender lubricant, metalworking fluid, refrigeration lubricant, two-cycle engine lubricant or crankcase lubricant.

Preferably, according to another aspect, the lube oil additive(s) comprise at least one of ashless dispersant, metal detergent, viscosity modifier, anti-wear agent, antioxidant, friction modifier, pour point depressant, anti-foaming agent, corrosion inhibitor, demulsifier, rust inhibitor and mixtures thereof. When the lube oil composition is used as a refrigeration lubricant, the lube oil additive(s) preferably comprise at least one of extreme pressure and antiwear additive, oxidation and thermal stability improver, corrosion inhibitor, viscosity index improver, pour point depressant, floc point depressant, detergent, anti-foaming agent, viscosity adjuster and mixtures thereof. It is intended to be within the scope of the present invention to use any one or more of the specified additives alone or in combination with one or more of the remaining specified additives. It is also within the scope of the present invention to use more than one of any specified additive, e.g., one or more friction modifiers, either alone or in combination of one or more of the other specified additives, e.g., in combination with one or more corrosion inhibitors.

As already noted, the identification and use of additives for any particular application is within the skill of the art. The individual additives may be incorporated into a base stock in any convenient way. Thus, each of the components can be added directly to the base stock by dispersing or dissolving it in the base stock at the desired level of concentration. Such blending may occur at ambient temperature or at an elevated temperature.

Alternatively, all or some of the additives can be blended into a concentrate or additive package that is subsequently blended into base stock to make finished lubricant. Use of such concentrates is conventional. The concentrate will typically be formulated to contain the additive(s) in proper amounts to provide the desired concentration in the final formulation when the concentrate is combined with a predetermined amount of base lubricant.

Non-limiting, illustrative examples of various additives follow.

The ashless dispersant comprises an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. The ashless dispersant may be, for example, selected from oil soluble salts, esters, amino-esters, amides, imides, and oxazolines of long chain hydrocarbon substituted mono and dicarboxylic acids or their anhydrides, thiocarboxylate derivatives of long chain hydrocarbons, long chain aliphatic hydrocarbons having a polyamine attached directly thereto, and Mannich condensation products formed by condensing a long chain substituted phenol with formaldehyde and polyalkylene polyamine.

The viscosity modifier (VM) functions to impart high and low temperature operability to a lubricating oil. The VM used may have that sole function, or may be multifunctional.

Multifunctional viscosity modifiers that also function as dispersants are also known. Illustrative viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

Metal-containing or ash-forming detergents function both as detergents to reduce or remove deposits and as acid neutralizers or rust inhibitors, thereby reducing wear and corrosion and extending engine life. Detergents generally comprise a polar head with long hydrophobic tail, with the polar head comprising a metal salt of an acid organic compound. The salts may contain a substantially stoichiometric amount of the metal in which they are usually described as normal or neutral salts, and would typically have a total base number (TBN), as may be measured by ASTM D-2896 of from 0 to 80. It is possible to include large amounts of a metal base by reacting an excess of a metal compound such as an oxide or hydroxide with an acid gas such as carbon dioxide. The resulting overbased detergent comprises neutralized detergent as the outer layer of a metal base (e.g., carbonate) micelle. Such overbased detergents may have a TBN of 150 or greater, and typically from 250 to 450 or more.

Illustrative detergents include oil-soluble neutral and overbased sulfonates, phenates, sulfurized phenates, thiophosphonates, salicylates, and nephthenates and other oil-soluble carboxylates of a metal, particularly the alkali or alkaline earth metals, e.g., sodium, potassium, lithium, calcium, and magnesium. The most commonly used metals are calcium and magnesium, which may both be present in detergents used in a lubricant, and mixtures of calcium and/or magnesium with sodium. Particularly convenient metal detergents are neutral and overbased calcium sulfonates having TBN of from 20 to 450 TBN, and neutral and overbased calcium phenates and sulfurized phenates having TBN of from 50 to 450.

Dihydrocarbyl dithiophosphate metal salts are frequently used as anti-wear and antioxidant agents. The metal may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt any basic or neutral zinc compound could be used but the oxides, hydroxides and carbonates are most generally employed. Commercial additives frequently contain an excess of zinc due to use of an excess of the basic zinc compound in the neutralization reaction.

Oxidation inhibitors or antioxidants reduce the tendency of base stocks to deteriorate in service which deterioration can be evidenced by the products of oxidation such as sludge and varnish-like deposits on the metal surfaces and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, ashless oil soluble phenates and sulfurized phenates, phosphosulfurized or sulfurized hydrocarbons, phosphorous esters, metal thiocarbamates, oil soluble copper compound as described in U.S. Pat. No. 4,867,890, and molybdenum containing compounds.

Friction modifiers may be included to improve fuel economy. Oil-soluble alkoxylated mono- and di-amines are well known to improve boundary layer lubrication. The amines may be used as such or in the form of an adduct or reaction product with a boron compound such as boric oxide, boron halide, metaborate, boric acid or a mono-, di- or tri-alkyl borate.

Other friction modifiers are known. Among these are esters formed by reacting carboxylic acids and anhydrides with alkanols. Other conventional friction modifiers generally consist of a polar terminal group (e.g. carboxyl or hydroxyl) covalently bonded to an oleophilic hydrocarbon chain. Esters of carboxylic acids and anhydrides with alkanols are described in U.S. Pat. No. 4,702,850. An example of another conventional friction modifier is organometallic molybdenum.

Illustrative rust inhibitors are selected from the group of nonionic polyoxyalkylene polyols and esters thereof, polyoxyalkylene phenols, and anionic alkyl sulfonic acids.

Copper and lead bearing corrosion inhibitors may also be used. Typically such compounds are the thiadiazole polysulfides containing from 5 to 50 carbon atoms, their derivatives and polymers thereof. Other additives are the thio- and polythio-sulfenamides of thiadiazoles such as those described in UK Patent Specification No. 1,560,830. Benzotriazoles derivatives also fall within this class of additives.

An illustrative example of demulsifying component is described in EP 330,522. It is obtained by reacting an alkylene oxide with an adduct obtained by reacting a bis-epoxide with a polyhydric alcohol.

Pour point depressants, otherwise known as lube oil improvers, lower the minimum temperature at which the fluid will flow or can be poured. Such additives are well known. Typical of those additives which improve the low temperature fluidity of the fluid are $C_8$ and $C_{18}$ dialkyl fumarate/vinyl acetate copolymers, polyalkylmethacrylates and the like. In view of the low pour points of the lube oil compositions of the present invention, it is possible to formulate a lube oil composition which is free of pour point depressant. However, there may be applications where it is desirable to further depress the already low pour point.

Foam control can be provided by many compounds including an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and does not require further elaboration.

Illustrative, non-limiting examples of additives specific to use in compression refrigeration systems follow.

Illustrative extreme pressure and antiwear additives include phosphates, phosphate esters (bicresyl phosphate), phosphites, thiophosphates (zinc diorganodithiophosphates) chlorinated waxes, sulfurized fats and olefins, organic lead compounds, fatty acids, molybdenum complexes, halogen substituted organosilicon compounds, borates, organic esters, halogen substituted phosphorous compounds, sulfurized Diels Alder adducts, organic sulfides, compounds containing chlorine and sulfur, metal salts of organic acids.

Illustrative oxidation and thermal stability improvers include sterically hindered phenols (BHT), aromatic amines, dithiophosphates, phosphites, sulfides and metal salts of dithio acids.

Illustrative corrosion inhibitors include organic acids, organic amines, organic phosphates, organic alcohols, metal sulfonates and organic phosphites.

Viscosity index is the measure of the change in viscosity with temperature, and a high number suggests that the change in viscosity with temperature is minimal. In view of the high viscosity index of the lube oil compositions of the present invention, it is possible to formulate a lube oil composition which is free of viscosity index improver. However, there may be applications where it is desirable to further improve viscosity index. Illustrative viscosity index improvers include polyisobutylene, polymethacrylate and polyalkylstyrenes.

Illustrative pour point and or floc point depressants include polymethacrylate ethylene—vinyl acetate copolymers, succinamic acid—olefin copolymers, ethylene—alpha olefin copolymers and Friedel-Crafts condensation products of wax with napthalene or phenols.

Illustrative detergents include sulfonates, long-chain alkyl substituted aromatic sulfonic acids, phosphonates, thiophosphonates, phenolates, metal salts of alkyl phenols, alkyl sulfides, alkylphenol—aldehyde condensation products, metal salts of substituted salicylates, N-substituted oligomers or polymers from the reaction products of unsaturated anhydrides and amines and co-polymers which incorporate polyester linkages such as vinyl acetate-maleic anhydride co-polymers.

Illustrative anti-foaming agents are silicone polymers.

Illustrative viscosity adjusters include polyisobutylene, polymethacrylates, polyalkylstyrenes, naphthenic oils, alkylbenzene oils, paraffinic oils, polyesters, polyvinylchloride and polyphosphates.

EXAMPLES

The following examples are presented for the purpose of illustrating the invention and are not intended to be limiting.

The number-average molecular weights (Mn) of polyether glycol were determined either by analyzing end-groups using NMR spectroscopic methods or by titration of hydroxyl groups.

Molecular weight distribution (Mw/Mn) of the polymer was measured by GPC.

Melting point ($T_m$), crystallization temperature ($T_c$) and glass transition temperature ($T_g$) were determined using the procedure of the American Society for Testing Materials ASTM D-3418 (1988) using a DuPont DSC Instrument Model 2100 (E. I. du Pont de Nemours and Co., Wilmington, Del. ("DuPont")), according to the manufacturer's instructions. The heating and cooling rates were 10° C. per minute.

ASTM method D445-83 and ASTM method D792-91 were used to determine the kinematic viscosity and density of the polymer, respectively.

Example 1

Preparation of Polytrimethylene Ether Glycol Homopolymer

A 1,3-propanediol obtained from a biochemical (renewable source) route (from DuPont) was used to make polymer as described below:

A 22-L, 4-necked, round-bottomed flask, equipped with a nitrogen inlet, and a distillation head was charged with 11877 g of 1,3-propanediol. The liquid was sparged with nitrogen at a rate of 10 L/min. and mechanical stirring (using a stirring magnet driven by a magnetic stirrer below the flask) was done for about 15 min. After 15 min., 108 g of sulfuric acid was slowly added drop-wise from a separatory funnel through one of the ports over a period of at least 5 minutes. When this was finished, 15 g of 1,3-propanediol (PDO) was added to the separatory funnel and swirled to remove any residual sulfuric acid. This was added to the flask. The mixture was stirred and sparged as above and heated to 160° C. The water of reaction was removed by distillation and was collected continuously during the polymerization reaction. The reaction was continued for 25 hours, after which it was allowed to cool (while stirring and sparging were maintained) to 45° C.

The crude material was hydrolyzed as follows. The crude polymer was added to a 22-L, 5-necked, round-bottom flask, (equipped with a condenser and a mechanical mixer) along with an equal volume of distilled water. This mixture was stirred mechanically, sparged with nitrogen at a rate of about 150 mL/min. and heated to 100° C. It was allowed to reflux for 4 hours after which the heat was turned off and the mixture allowed to cool to 45° C. The stirring was discontinued and the sparging reduced to a minimum. Phase separation occurred during cooling. The aqueous phase water was removed and discarded. A volume of distilled water equal to the initial amount was added to the wet polymer remaining in the flask. Mixing, sparging and heating to 100° C. was done again for 1 hour after which the heat was turned off and the material allowed to cool as before. The aqueous phase was removed and discarded.

The residual sulphuric acid was determined by titration and neutralized with an excess of calcium hydroxide. The polymer was dried under reduced pressure at 90° C. for 3 hours and then filtered through a Whatman filter paper precoated with a CELPURE C-65 filter aid. The purified homopolymer properties are reported in Table 1.

Example 2

Preparation of Poly(Trimethylene-Ethylene Ether)Glycol

The procedure described as in Example 1 was repeated except for variation in the amounts of 1,3-propanediol (8811.2 g), 1,2-ethanediol (3080.8 g) and sulfuric acid (108 g). The copolymer properties are reported in Table 1.

Example 3

Preparation of Poly(Trimethylene-Ethylene Ether) Glycol

Example 2 was repeated with the exception that the polymerization reaction time was 45 hours. The copolymer properties are reported in Table 1.

Table 1 also lists the properties of two UCON fluids (from Dow): 75-H-450 and 75-H-1400 (Control 1 and Control 2, respectively). These controls are water-soluble random copolymers of ethylene oxide and propylene oxide with hydroxyl ends.

TABLE 1

Comparative Properties of Polyalkylen Glycol Base Stocks

| Properties | Example 1 | Example 2 | Example 3 | Control 1 75-H-450[a] | Control 2 75-H-1400[a] |
|---|---|---|---|---|---|
| Mole % of ethylene oxide | 0 | 30 | 30 | 75 | 75 |
| Molecular weight, $M_n$ | 1074 | 1130 | 3047 | 980 | 2470 |
| $M_w/M_n$ | 1.44 | 1.44 | 1.85 | 1.07 | 1.19 |
| Viscosity, cSt | | | | | |
| @ 40° C. | 207 | 176 | 1212 | 60 | 290 |
| @100° C. | 32 | 28.4 | 194 | 19.6 | 41.5 |
| Viscosity Index (ASTM D2270) | 200 | 201 | 289 | 184 | 207 |
| Density, g/cc @ 40° C. | 1.017 | 1.031 | 1.030 | 1.079 | 1.066 |
| $T_g$, ° C. | −76 | −75 | −73 | −65 | −65 |
| $T_c$, ° C. | −34 | None | None | None | None |
| $T_m$, ° C. | 16 | None | None | −2.4 | 1.8 |
| Pour Point, ° C. (ASTM D97) | −12 | −42 | −30 | −15 | 4 |
| Solubility in water | Insoluble | Insoluble | Insoluble | Soluble | Soluble |
| Flash Point, ° F. (ASTM D92) | ND | 495 | 505 | 465 | 520 |

[a]The values for molecular weight, viscosity index, density, pour point, and flash point are from Dow's literature on "UCON fluids and lubricants".
The molecular weight distribution, glass transition and melt temperatures were measured form GPC and DSC, respectively.
The notation "ND" indicates the data was not determinced.

The copolymer of 1,3-propanediol and ethylene glycol base stock, when compared to homopolymer having similar molecular weight, is amorphous and possesses very low pour point, and has slightly lower viscosity. The polyalkylene glycols of the present invention are distinguished from UCON fluids in properties such as molecular weight distribution, pour point, viscosity and water-solubility. The polyalkylene glycols of the present invention are water-insoluble and less hygroscopic than UCON fluids. High viscosity indices of the copolymers having broad molecular weight distribution are surprising. The combination of high viscosity index with very low pour point is highly desirable in many lube applications.

Table 2 lists the percent weight loss of polyalkylene glycols of the present invention as a function of temperature, measured from Thermogravimetric analysis. The samples were heated at heating rate of 10° C. per minute in the presence of air or nitrogen. The higher the temperature at a specified weight loss, the higher the stability of the polymer.

TABLE 2

| | | Temperature at specified weight loss | | | |
|---|---|---|---|---|---|
| | | Air | | Nitrogen | |
| Polyalkylene Glycol | MW | 10% | 90% | 10% | 90% |
| Example 2 | 1130 | 203 | 317 | 278 | 395 |
| Example 3 | 3047 | 226 | 333 | 354 | 412 |
| 75-H-450 | 980 | 169 | 228 | 313 | 388 |
| 75-H-1400 | 2470 | 190 | 247 | 314 | 378 |

Example 4

The poly(trimethylene-ethylene ether) glycol base stock described in Example 2 is blended with another base stock, 75H-450, by 50/50 wt %, and the resulting miscible mixture has the following properties:
Kinematic viscosity at 40° C.=119 cSt
Kinematic viscosity at 100° C.=21.2 cSt
Viscosity Index=204

Example 5

The poly(trimethylene-ethylene ether) glycol described in Example 3 is blended with 75H-1400 by 50/50 wt %, and the resulting miscible base stock has the following properties:

Kinematic viscosity at 40° C.=576 cSt
Kinematic Viscosity at 100° C.=99.3 cSt
Viscosity Index=265

Example 6

Comparison of Lube Properties

Properties of a lube oil base stock comprising poly (trimethylene-ethylene ether) glycol were compared to those of two Dow lube oil base stocks, UCON 75-H-450 and 75H-1400. The results are reported in Table 3. It was found that the copolymers of 1,3-propanediol and ethylene glycol have 250 pounds more load-carrying capacity than UCON Fluids of similar molecular weight when tested in Falex test (ASTM D2783).

TABLE 3

Comparative Lube Properties of Copolyols

| Test Method | Property | Ex 2 | Ex 3 | UCON 75H-450 | UCON 75H-1400 |
|---|---|---|---|---|---|
| ASTM D4172 | Wear Scar, mm | 0.42 | 0.51 | 0.39 | 0.38 |
| 4 Ball Wear Test | Coefficient of friction (COF) | 0.069 | 0.064 | 0.072 | 0.060 |
| ASTM D3233 | Max Load, lb | 1250 | 1500 | 1000 | 1250 |
| Falex Test | Torque at max load, lb-in | 25 | 22 | 35 | 20 |
| ASTM D2714 | COF at 200 rev | 0.11 | 0.07 | 0.14 | 0.13 |
| Block on ring | COF at 4500 rev | 0.07 | 0.03 | 0.11 | 0.02 |
| friction & wear | Ring weight loss, mg | 0.0 | 0.8 | 0.0 | 0.4 |
| | Block weight loss, mg | 1.4 | 1.3 | 2.5 | 4.4 |
| | Average wear scar, mm | 1.85 | 1.19 | 1.97 | 1.89 |

Example 7

A lube oil composition comprises:
98.5 wt % of poly(trimethylene-ethylene ether) glycol of molecular weight 1130
0.5 wt % of phenyl-alpha-naphthylamine
1.0 wt % oleic acid.

What is claimed is:

1. A lube oil composition comprising:
    (a) poly(trimethylene-ethylene ether) glycol base stock produced from the acid-catalyzed polycondensation of 1,3-propanediol and 1,2-ethanediol, and
    (b) at least one lube oil additive.

2. The lube oil composition of claim 1, wherein the lube oil additive comprises at least one of ashless dispersant, metal detergent, viscosity modifier, anti-wear agent, antioxidant, friction modifier, pour point depressant, anti-foaming agent, corrosion inhibitor, demulsifier, runt inhibitor, or mixtures thereof.

3. The lube oil composition of claim 1, wherein the poly(trimethylene-ethylene ether) glycol base stock has a number average molecular weight of 500 to 5000.

4. The lube oil composition of claim 1, wherein the poly(trimethylene-ethylene ether) glycol base stock has a number average molecular weight of 700 to 4000.

5. The lube oil composition of claim 1, wherein the poly(trimethylene-ethylene ether) glycol base stock has a number average molecular weight of 1000 to 3000.

6. The lube oil composition of claim 1, wherein the poly(trimethylene ethylene ether) glycol base stock has a molecular weight distribution of 12 to 2.2.

7. The lube oil composition of claim 1, wherein the poly(trimethylene-ethylene ether) glycol base stock has a molecular weight distribution of 1.4 to 2.0.

8. The lube oil composition of claim 1, wherein the poly(trimethylene-ethylene ether) glycol base stock has a molecular weight distribution of 1.4 to 1.8.

9. The lube oil composition of claim 1, wherein the poly(trimethylene-ethylene ether) glycol base stock has a kinematic viscosity at 40° C. of about 50 to about 2000 centistokes.

10. The lube oil composition of claim 1, wherein the poly(trimethylene-ethylene ether) glycol base stock has a kinematic viscosity at 40° C. of about 100 to about 1500 centistokes.

11. The lube oil composition of claim 1, wherein the poly(trimethylene-ethylene ether) glycol base stock has a kinematic viscosity at 40° C. of about 150 to about 1000 centistokes.

12. The lube oil composition of claim 1, wherein the poly(trimethylene-ethylene ether) glycol base stock has a viscosity index of 150 to 350.

13. The lube oil composition of claim 1, wherein the poly(trimethylene-ethylene ether) glycol base stock has a viscosity index of 175 to 325.

14. The lube oil composition of claim 1, wherein the poly(trimethylene-ethylene ether) glycol base stock has a viscosity index of 200 to 300.

15. The lube oil composition of claim 1, wherein the poly(trimethylene-ethylene ether) glycol base stock has a pour point of −75 to −10° C.

16. The lube oil composition of claim 1, wherein the poly(trimethylene-ethylene ether) glycol base stock has a pour point of −60 to −10° C.

17. The lube oil composition of claim 1, wherein the poly(trimethylene-ethylene ether) glycol base stock has a pour point of −50 to −20° C.

18. The lube oil composition of claim 1, wherein the poly(trimethylene-ethylene ether) glycol base stock is water-insoluble.

19. The lube oil composition of claim 1, further comprising additional base stock.

20. The lube oil composition of claim 19, wherein the additional base stock comprises at least one of hydrocarbonaceous base stock, synthetic base stock, or mixtures thereof.

21. The lube oil composition of claim 19, wherein the additional base stock comprises synthetic base stock.

22. The lube oil composition of claim 1, wherein at least one of the 1,3-propanediol or 1,2-ethanediol is derived from a renewable source.

23. The lube oil composition of claim 22, wherein the 1,3-propanediol is derived from a renewable source.

24. The lube oil composition of claim 1, wherein said composition is mixed with at least one tetrafluroethane.

25. The lube oil composition of claim 1, wherein said composition is free of pour point depressant additive.

26. The lube oil composition of claim 1, wherein said composition is free of viscosity index improver additive.

27. A refrigerant system comprising a refrigerant and refrigerant lubricant, wherein the refrigerant lubricant comprises:
(a) poly(trimethylene-ethylene ether) glycol base stock and
(b) at least one lube oil additive.

28. The refrigerant system of claim 27, wherein the refrigerant is a tetrafluroethane.

29. The refrigerant system of claim 27, wherein the poly(trimethylene-ethylene ether) glycol base stock is produced from the acid-catalyzed polycondensation of 1,3-propanediol and 1,2-ethanediol.

30. The refrigerant system of claim 29, wherein the refrigerant is a tetrafluroethane.

31. The refrigerant system of claim 29, wherein at least one of the 1,3-propanediol or 1,2-ethanediol is derived from a renewable source.

32. The refrigerant system of claim 30, wherein the 1,3-propanediol is derived from a renewable source.

* * * * *